United States Patent
Vogel

[11] 3,818,722
[45] June 25, 1974

[54] POWER UNIT FOR TOOLS
[75] Inventor: Eberhard Vogel, Schonaich, Germany
[73] Assignee: Robert Bosch GmbH, Stuttgart, Germany
[22] Filed: Sept. 1, 1972
[21] Appl. No.: 285,865

Related U.S. Application Data
[63] Continuation of Ser. No. 89,354, Nov. 13, 1970, abandoned.

[52] U.S. Cl................................ 64/30 E, 64/30 R
[51] Int. Cl............................................. F16d 7/02
[58] Field of Search.... 64/30 A, 30 LB, 30 E, 30 R; 81/52.4

[56] References Cited
UNITED STATES PATENTS
1,634,942  7/1927   Hillborn.................................. 64/30
2,527,517  10/1950  Barker et al......................... 64/30 A
2,569,144  9/1951   Benson.................................... 64/30
2,601,012  6/1952   Wolff.................................. 64/30 LB
3,080,735  3/1963   Blom, Jr. et al.................. 64/30 R Primary Examiner—Samuel Scott
Assistant Examiner—Randall Heald
Attorney, Agent, or Firm—Michael S. Striker

[57] ABSTRACT

A power unit for tools comprises a drive and a tool spindle which is mounted to be rotated by the drive. The tool spindle has a free end portion, and slip coupling means surrounds the free end portion and serves for connecting the tool spindle and drive in torque-transmitting relationship.

4 Claims, 1 Drawing Figure

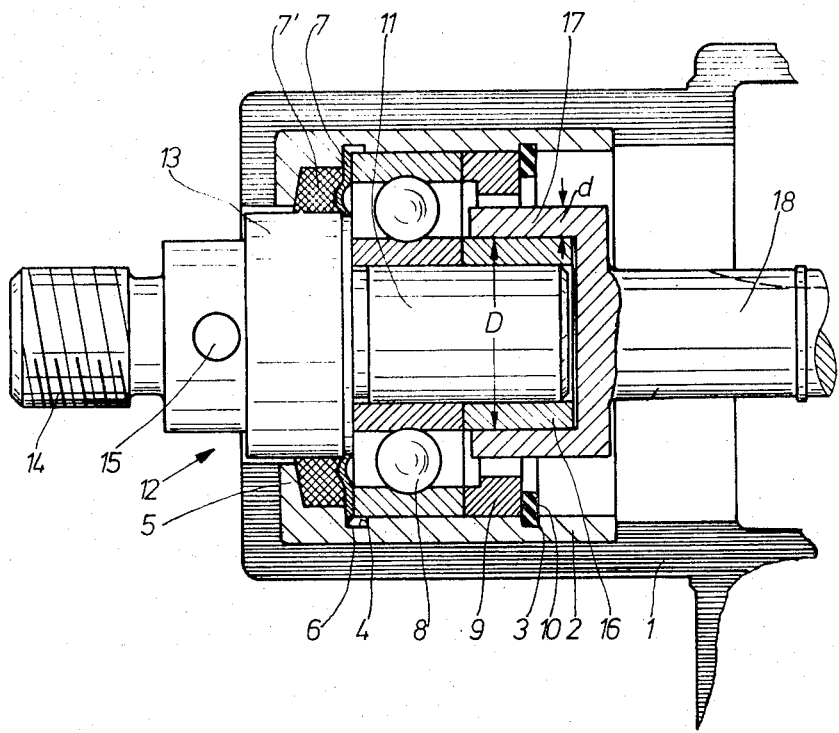

POWER UNIT FOR TOOLS

This is a continuation of application Ser. No. 89,354, filed Nov. 13, 1970, now abandoned.

BACKGROUND OF THE INVENTION

The present invention relates generally to a power unit and more particularly to a power unit for powering tools. Still more particularly the present invention relates to a power unit which is particularly suitable for powering do-it-yourself or home tools.

Because of the reluctance or inability on the part of a do-it-yourself or home worker to invest large amounts of money in a great variety of different tools needed for work which is required to be done around the home, suppliers of such tools attempt to solve the problem by providing a single drive or power unit to which different tools may be connected as required. For instance, such a power unit may be basically in form of a hand-held electric drill to which additional tools may be connected as required, such as a circular-saw attachment, a sanding attachment, a hedge-clipper attachment, and the like. Thus, the more expensive part of the set, namely the drive or power unit, needs to be purchased only once in form of the hand-held electric drill, and the various attachments—which in themselves are not provided with power units—are simpler and less expensive; they receive their power by being connected with the electric drill via suitable adapters if necessary.

The problem with this otherwise satisfactory arrangement is, as has been found by experience, that the use of the power unit—which, as pointed out before, is most usually in form of an electric hand-held drill but which for the sake of convenience will continue to be identified as a power unit herein—in conjunction with the various attachments subjects the drive component of the power unit itself to frequently occurring rapid torque increases which quite often far exceed similar factors which would normally occur during the operation of the power unit alone, that is during the operation of the power unit as an electric drill. For instance, the tooth pressure of a circular saw attachment which is driven by the power unit can make itself felt in form of force peaks which amount to more than 2 m/cp. As another example, assuming that the power unit powers a hedge-clipper attachment and if inadvertently wires or particularly thick or tenacious branches are cut with the hedge-clipper attachment, still higher forces may act upon the drive components. It is evident that such forces can lead to damage of the power unit itself.

No satisfactory solution to this problem has heretofore been proposed in the art, and the ever-increasing popularity of the type of power-unit-cum-tool attachment combination here in question makes it important that this difficulty be overcome without further delay.

SUMMARY OF THE INVENTION

It is, accordingly, an object of the present invention to overcome the aforementioned disadvantages.

More particularly it is an object of the present invention to provide a power unit of the type under discussion which is not possessed of these disadvantages.

It is a concomitant object of the invention to provide such a power unit which is not only protected from damage by such rotary impulses as have been described above, but wherein the means providing such protection requires no substantial additional space, is not heavy and thus does not significantly increase the weight of the unit and is not expensive.

In pursuance of the above objects and others which will become apparent hereafter, the present invention resides, according to one feature briefly stated, in the provision of a power unit particularly suitable for powering home tools, which has drive means and a tool spindle means mounted for rotation by said drive means and having a free end portion adjacent the same. Slip coupling means surrounds the free end portion and is operative for connecting the tool spindle means and the drive means in torque-transmitting relationship.

The slip coupling means is particularly advantageous in view of the requirements in the instant application, if it is so constructed that torque is transmitted by radial pressure, the simplest construction for this purpose being that the slip coupling means comprises a steel sleeve which acts via a slip sleeve upon a steel pin.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying description of the drawing.

BRIEF DESCRIPTION OF THE DRAWING

The single FIGURE is a fragmentary somewhat diagrammatic longitudinal section through a power unit embodying the present invention.

DESCRIPTION OF THE PREFERRED EMBODIMENTS

Discussing now the drawing in detail it will be seen that reference numeral 1 identifies a portion of a housing of the power unit, with the remainder not being illustrated because it is of no consequence for the understanding of the present invention. As pointed out earlier, such a power unit may be and conventionally is in form of a hand-held electric drill, but it could also be constructed differently.

What is of importance is that the illustrated portion of the housing 1 is the journalling portion for a tool spindle 12 which is screwthreaded at 14 so that a chuck and other components may be connected to it, the "other components" referring either directly or indirectly (because there may be connectors) to the securing of tool attachments which are to be driven by the power unit.

The portion of the housing 1 in which the tool spindle is journalled is advantageously of synthetic plastic material and comprises a steel sleeve 2 embedded in it. The steel sleeve 2 in turn is provided with two axially spaced internal grooves 3 and 4 and a flange 5 extending radially inwardly at that axial end of the sleeve 2 which is remote from the drive means, here exemplified by the drive shaft 18. Evidently the drive shaft 18 will be rotated in some manner, for instance by an electromotor if the power unit is an electric drill. However, for purposes of the present invention the drive shaft 18 may be considered the drive means because it transmits motion to and thus drives the tool spindle 12.

The inner diameter of the sleeve 2 intermediate the groove 4 and the flange 5 is smaller than its inner diameter intermediate the grooves 3 and 4 and between the groove 3 and the right-hand axial end of the sleeve 2. The purpose is to form a radial shoulder 6 at the left-hand end of the groove 4, as illustrated. A limiting washer 7 is introduced into the sleeve 2 and abuts against the shoulder 6, with a radial ball bearing 8 being received in the sleeve 2 and abutting against the washer 7. A spacing ring 9 is provided at that axial end of the bearing 8 which is remote from the washer 7, and the ring 9 in turn abuts against a spring ring 10 which is received in the groove 3 of the sleeve 2.

The tool spindle 12 has an inner free end portion or pin 11 of cylindrical configuration which is received in the confines of the inner race of the bearing 8; another portion 13 of larger diameter than the end portion 11 of the tool spindle 12 abuts against the axial end face of the inner race as illustrated. A backing or seal 7' of felt or another suitable material is compressingly confined between the flange 5 and the washer 7 and serves to provide a seal for the portion 13. As already pointed out, the outwardly projecting part of the tool spindle 12 is screwthreaded at 14; a transverse bore 15 is provided into which a pin may be inserted so that the spindle 12 can be held stationary when a chuck or other component is threaded onto it via the screwthreads 14.

As the drawing shows, the end portion 11 projects towards the right beyond the bearing 8 by an extent which corresponds approximately to the diameter of the end portion 11. Here it carries a slip sleeve 16 which, generally speaking, is preferred to be made of a non-ferrous metal and which in the illustrated embodiment is of brass. The outer surface of the slip sleeve 16 is cylindrical and is ground and polished. A steel sleeve 17 embraces the slip sleeve 16 exteriorly; its inner diameter is less than the outer diameter of the slip sleeve 16 by between 8 and 12 microns; the steel sleeve 17 is in the illustrated embodiment of one piece with the drive shaft 18 and its inner cylindrical surface is also ground and polished. Of course, the sleeve 17 could be a separate element which could be welded or otherwise rigidly secured to the drive shaft 18 instead of being made of one piece with the same. The inner diameter D of the sleeve 17 has a ratio relative to the wall thickness $d$ of the sleeve 17 of preferably 5.5:1; within the context of the present invention this ratio should be at least 4.5:1 and at most 6.5:1. The preferred range of the ratio is at least 5:1 and at most 6:1. The sleeve 17 surrounds the slip sleeve 16 with a press fit, and before it is pressed onto the sleeve 16 the outer cylindrical surface of the latter—and/or the inner cylindrical surface of the sleeve 17—is treated with a lubricant containing molybdenum sulfide.

It will be appreciated that various modifications may be made in the exemplary construction without departing in any sense from the present invention. Thus, the interference of the sleeve 17 with respect to the sleeve 16, that is the factor by which the outer diameter of the sleeve 16 exceeds the inner diameter of the sleeve 17, may be on the order of between 6 and 15 $\mu$m, although preferably it is between 8 and 12 $\mu$m, as pointed out earlier.

The present invention thus provides for a slip coupling which is so small in its space requirements that it can be readily and without any difficulties accommodated in the tool spindle journalling portion of the housing of a power unit of the type under discussion. Furthermore, it is light in weight and it is inexpensive in its construction. All of these features make it ideal for use under the circumstances described earlier where a conventional slip coupling cannot be employed because of its space requirements, its increased weight and its more expensive construction. It will be appreciated that there is normally no relative angular displacement of the tool spindle 12 and the drive shaft 18, with the former being driven in rotation by the latter when the power unit is in operation. However, when rotary impulses act upon the tool spindle 12 which are of such magnitude that if unchecked they could cause damage to the drive components and/or the journals, the sleeves 16 and 17 are capable of relative angular displacement to a small extent, whereby the damaging rotary impulse energy is transformed into heat energy which is not great enough to do any damage, while simultaneously the rotary energy is prevented from acting upon and doing damage to the components of the power unit which are susceptible to such damage, such as the teeth of gears, journals, and the like.

Although specific materials have been described in the discussion of the exemplary illustrated embodiment, it will be appreciated that other materials capable of affording the same advantages can be substituted. For instance, it is possible to make the sleeve 16 of another material which affords the possibility of relative angular displacement of sleeve 16 with reference to sleeve 17, for instance of a synthetic plastic material.

It will be understood that each of the elements described above, or two or more together, may also find a useful application in other types of constructions differing from the types described above.

While the invention has been illustrated and described as embodied in a power unit for tools, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

1. In a power hand tool, a combination comprising a stationary housing; rotary drive means mounted in said housing; tool spindle means mounted for rotation by said drive means and subject at times to sudden retardation of its rotary movement with a resultant temporary rapid increase in the torque acting upon said tool spindle means; a cylindrical steel sleeve on one of said means; and a cylindrical slip sleeve of a hard substantially rigid material on the other of said means press-fitted within and in low-friction engagement with said steel sleeve, the inner diameter of said steel sleeve being smaller than the outer diameter of said slip sleeve by between 6 and 15 $\mu$m and the frictional relationship between said sleeves being such as to effect the transmission of substantially constant torque between them but to permit only fractional relative slippage in response to the occurrence of a rapid but merely momentary increase of the torque acting upon said tool spindle means.

2. In a power hand tool, a combination comprising a stationary housing; rotary drive means mounted in said housing; tool spindle means mounted for rotation by said drive means and subject at times to sudden retardation of its rotary movement with a resultant temporary rapid increase in the torque acting upon said tool spindle means; a cylindrical steel sleeve on one of said means, the ratio of the inner diameter of said steel sleeve to the wall thickness of the same being at least 4.5:1 and at most 6.5:1; and a cylindrical slip sleeve of a hard substantially rigid material on the other of said means press-fitted within and in low-friction engagement with said steel sleeve, the frictional relationship between said sleeves being such as to effect the transmission of substantially constant torque between them but to permit only fractional relative slippage in response to the occurrence of a rapid but merely momentary increase of the torque acting upon said tool spindle means.

3. In a power hand tool, a combination comprising a stationary housing; rotary drive means mounted in said housing; tool spindle means mounted for rotation by said drive means and subject at times to sudden retardation of its rotary movement with a resultant temporary rapid increase in the torque acting upon said tool spindle means; a cylindrical steel sleeve on one of said means; a cylindrical slip sleeve of a hard substantially rigid material on the other of said means press-fitted within and in low-friction engagement with said steel sleeve, the frictional relationship between said sleeves being such as to effect the transmission of substantially constant torque between them but to permit only fractional relative slippage in response to the occurrence of a rapid but merely momentary increase of the torque acting upon said tool spindle means; and anti-friction bearing means mounted in said housing for maintaining the position of said tool spindle means in relation to said housing and said drive means.

4. In a power unit, particularly for powering hand tools, a combination comprising rotary drive means; output shaft means mounted for rotation by said drive means and subject at times to sudden retardation of its rotary movement with a resultant temporary rapid increase in the torque acting upon said output shaft means; a cylindrical steel sleeve on one of said means and having an inner surface of substantially constant diameter; a cylindrical slip sleeve of a hard substantially rigid material on the other of said means press-fitted within said steel sleeve and having an outer surface of substantially constant diameter in low-friction engagement with said inner surface of said steel sleeve over the entire interface therewith, the frictional relationship between said sleeves being such as to effect the transmission of substantially constant torque between them but to permit only fractional relative slippage in response to the occurrence of a rapid but merely momentary increase of the torque acting upon said output shaft means.

* * * * *